US009511960B1

(12) United States Patent
Bradford

(10) Patent No.: US 9,511,960 B1
(45) Date of Patent: Dec. 6, 2016

(54) MOBILE DOCK TRAILER

(71) Applicant: Rick Bradford, Bakersfield, CA (US)

(72) Inventor: Rick Bradford, Bakersfield, CA (US)

( * ) Notice: Subject to any disclaimer, the term of this patent is extended or adjusted under 35 U.S.C. 154(b) by 0 days.

(21) Appl. No.: 14/595,488

(22) Filed: Jan. 13, 2015

(51) Int. Cl.
*B65G 69/22* (2006.01)
*B65G 67/04* (2006.01)
*B65G 67/24* (2006.01)

(52) U.S. Cl.
CPC ............. *B65G 69/22* (2013.01); *B65G 67/04* (2013.01); *B65G 67/24* (2013.01)

(58) Field of Classification Search
CPC .......... B65G 69/22; B65G 67/24; B65G 67/04
See application file for complete search history.

(56) References Cited

U.S. PATENT DOCUMENTS

| | | | | |
|---|---|---|---|---|
| 3,457,396 A * | 7/1969 | Mrsny | ...................... | B60Q 3/06 362/20 |
| 3,934,635 A * | 1/1976 | Kin | ...................... | E05D 15/248 160/189 |
| 4,668,008 A * | 5/1987 | Stinson | ...................... | B60J 5/062 105/378 |
| 5,483,427 A * | 1/1996 | Dealey, Jr. | ............... | B60Q 3/06 362/330 |
| 5,501,503 A * | 3/1996 | Thayer | ....................... | B60J 5/14 160/201 |
| 5,678,914 A * | 10/1997 | Dealey | ..................... | B60Q 3/06 362/485 |
| 5,915,913 A * | 6/1999 | Greenlaw | .............. | B61D 47/00 187/267 |
| 5,931,262 A * | 8/1999 | Greenlaw | ................. | B60P 1/02 187/235 |
| 6,152,586 A * | 11/2000 | Dealey, Jr. | ............ | B60Q 3/004 362/459 |
| 6,474,446 B1 * | 11/2002 | Greenlaw | ................ | B60P 1/02 187/244 |
| 2003/0123967 A1 * | 7/2003 | Bonsall | ..................... | B60P 3/04 414/537 |
| 2007/0046066 A1 * | 3/2007 | Cosgrove | ............ | B62D 35/001 296/180.4 |
| 2011/0079674 A1 * | 4/2011 | Prochnow | ............ | B65G 69/008 242/390.2 |
| 2015/0009046 A1 * | 1/2015 | Senfleben | ............... | G09F 21/04 340/901 |

\* cited by examiner

*Primary Examiner* — Jeanette E Chapman
(74) *Attorney, Agent, or Firm* — R. Scott Kimsey, Esq.; Klein DeNatale Goldner

(57) ABSTRACT

A mobile dock trailer includes a dock enclosure having first and second opposing side walls and first and second opposing end walls. A first loading door is positioned in the first side wall, a second loading door is positioned in the second side wall, and a third loading door is positioned in the second end wall. First and second wheels are attached to an underside of the dock enclosure. A stationary support is attached to the underside of the dock enclosure at a location distal to the first and second wheels.

9 Claims, 8 Drawing Sheets

MOBILE DOCK TRAILER

RELATED APPLICATIONS

Not Applicable.

BACKGROUND OF THE INVENTION

1. Field of the Invention

The present disclosure relates generally to a loading dock for use with trucks, shipping trailers, and other vehicles, and more specifically to a mobile, multi-capacity trailer dock.

2. Background

Structures such as warehouses, manufacturing facilities, retail buildings, and other buildings often include at least one loading docking for receiving trucks with shipping trailers so that goods can be transferred from the trailer to the facility or vice versa. These docks are often located near the facility's staging areas, storage rooms, or freight elevators. Loading docks may include a variety of associated structures, such as bumpers to protect the dock from damage by trucks, an adjustable-height platform between the dock and the truck, dock seals to provide protection against the elements, and a dock lock to prevent a truck or trailer for rolling during loading and unloading operations. Many structures associated with loading docks are designed to increase the efficiency of the loading and unloading processes.

Hindrances to efficiency continue to exist, however. Buildings are equipped with a limited number of loading docks, and the number of truck trailers received at those docks during a given time interval often results in the number of available docks being the limiting factor in terms of efficiency of loading or unloading. Increasing the number of loading docks in the structure is often impractical or impossible, and even if this can be done the use of additional loading docks increases the cost of labor as additional workers are needed to man the new loading docks. Without sufficient personnel present at the new loading docks, they cannot be used to increase the speed of the loading and unloading operations.

SUMMARY OF THE INVENTION

A mobile dock trailer includes a dock enclosure having first and second opposing side walls and first and second opposing end walls. A first loading door is positioned in the first side wall, a second loading door is positioned in the second side wall, and a third loading door is positioned in the second end wall. First and second wheels are attached to an underside of the dock enclosure. A stationary support is attached to the underside of the dock enclosure at a location distal to the first and second wheels.

Some embodiments of the mobile dock include a first pair of tracks attached to a ceiling of the dock enclosure and the first side wall in a position flanking the first loading door. The first loading door includes a roll-up door engaging said first pair of tracks. A second pair of tracks is attached to the ceiling of the dock enclosure and the second side wall in a position flanking the second loading door, the second loading door having a roll-up door engaging said second pair of tracks. The first pair of tracks and the second pair of tracks are spaced apart relative to one another so that the first roll-up door and the second roll-up door overlap when rolled up, such that both roll-up doors can be rolled up simultaneously.

Some embodiments of the mobile dock include a third pair of tracks attached to the ceiling of the dock enclosure and the second end wall in a position flanking the third loading door, the third loading door having a roll-up door engaging said third pair of tracks.

Some embodiments of the mobile dock include a first side bumper attached to an exterior surface of the first side wall and extending therefrom, the first side bumper adjacent a first side of the first side door, a second side bumper attached to an exterior surface of the first side wall and extending therefrom, the second side bumper adjacent a second side of the first side door, a first top bumper attached to an exterior surface of the first side wall and extending therefrom, the first top bumper adjacent a top of the first side door, and a first bottom bumper attached to an exterior surface of the first side wall and extending therefrom, the first bottom bumper adjacent a bottom of the first side door.

A mobile dock trailer may also include a dock hook attached to the dock enclosure at one end thereof, the dook hook being fixedly or releasably attached to the mobile dock trailer and having one end configured to secure to a loading dock so that the mobile dock trailer is held securely in place during loading and unloading of the mobile dock.

A mobile dock trailer may also include a wheel lock for locking the first and second wheels in a secure position. Any suitable wheel locking mechanism known in the art may be utilized.

A mobile dock trailer may also include a personnel door in the first side wall of the dock enclosure, preferably adjacent to the first end wall of the dock enclosure.

A mobile dock may also include fourth, fifth, sixth, and seventh loading doors, with the fourth and fifth loading doors in the first side wall and the sixth and seventh loading doors in the second side wall.

A mobile dock may also include at least one bumper extending along the perimeter of each of the loading doors.

A mobile dock may also include interior lighting for illuminating the interior thereof.

A method of loading and unloading trucks includes the steps of positioning a mobile dock adjacent a loading dock for loading and unloading of the mobile dock, the mobile dock including first and second opposing side walls, first and second opposing end walls, a first loading door in the first side wall, a second loading door in the second side wall, and a third loading door in the second end wall; receiving a first truck at the first loading door of the mobile dock for loading and unloading items between the mobile dock and the first truck; and receiving a second truck at the second loading door of the mobile dock for loading and unloading items between the mobile dock and the second truck.

DETAILED DESCRIPTION OF THE INVENTION

Figure 1:
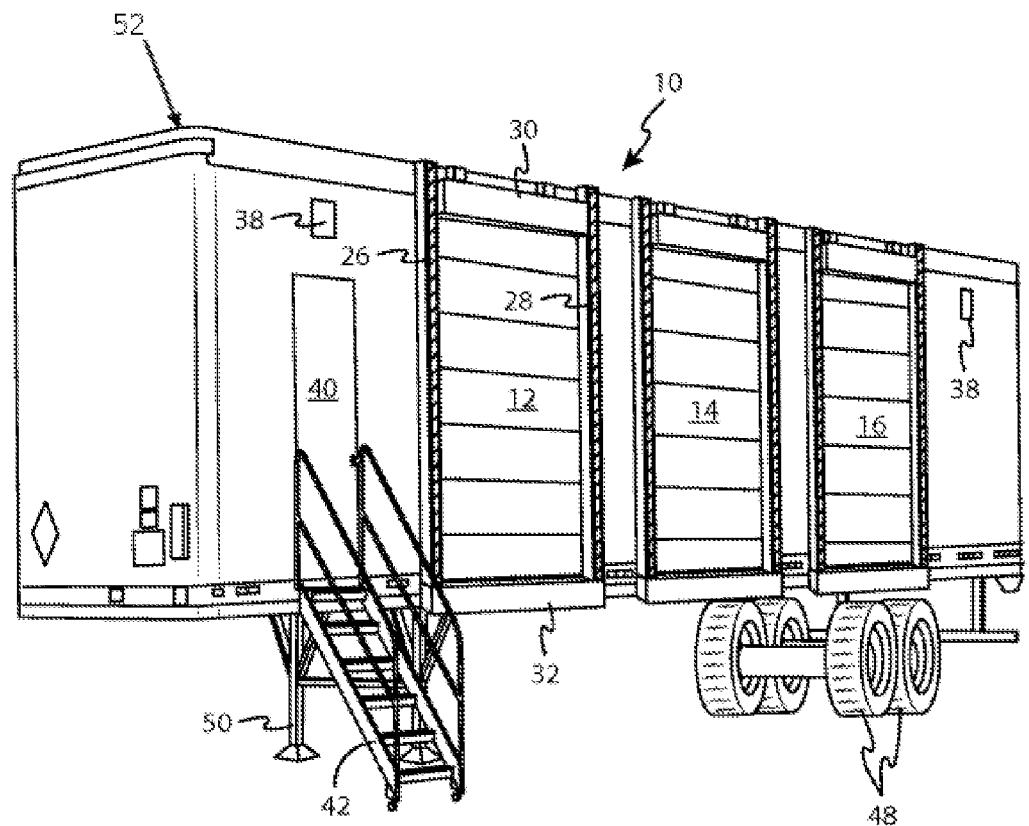
FIG. 1 is a side, perspective view of one embodiment of a mobile dock.

Turning now to the drawings, wherein like numerals indicate like parts, FIG. 1 depicts one embodiment of the present mobile dock trailer 10. Mobile dock trailer 10 includes a dock enclosure 52, which may be an elongate semi-trailer of the type depicted in the drawing. Dock enclosure 52 may be constructed of any suitable material, including, for example, steel, aluminum, wood, and composite materials. Mobile dock trailer 52 includes a plurality of doors, including first door 12, second door 14, and third door 16, which are visible from the view of mobile dock trailer 10 shown in FIG. 1. Also shown in FIG. 1 are first side door 40, first side stairs 42, landing gear or support 50, wheels 48, and exterior lights 38. Each of doors 12, 14, and 16 are preferably lined with bumpers such as those shown in the drawing, namely first side bumper 26, second side bumper 28, top bumper 30, and bottom bumper 32. Bumpers 26, 28, 30, and 32 may be constructed from any suitable material, including, for example, reinforced rubber.

Figure 2:
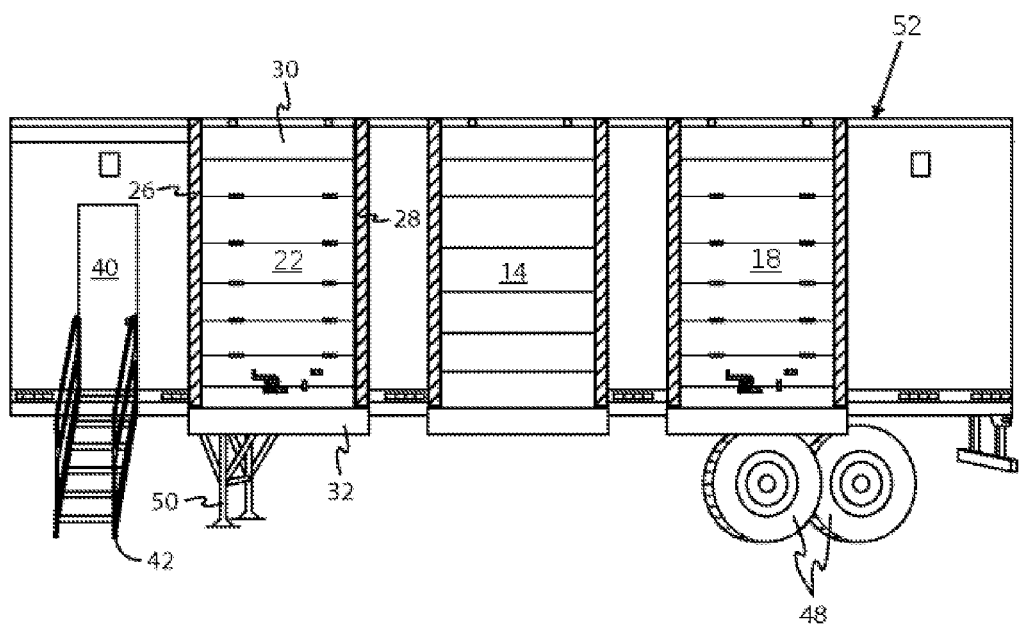
FIG. 2 is a side view of the embodiment of a mobile dock shown in FIG. 1.

FIG. 2 depicts the mobile dock trailer 10 of FIG. 1, with a side view showing first door 12 and third door 16 in an open position, revealing the interior of dock enclosure 52. Fourth door 18 and sixth door 22 are visible through the interior of dock enclosure 52.

Figure 3:
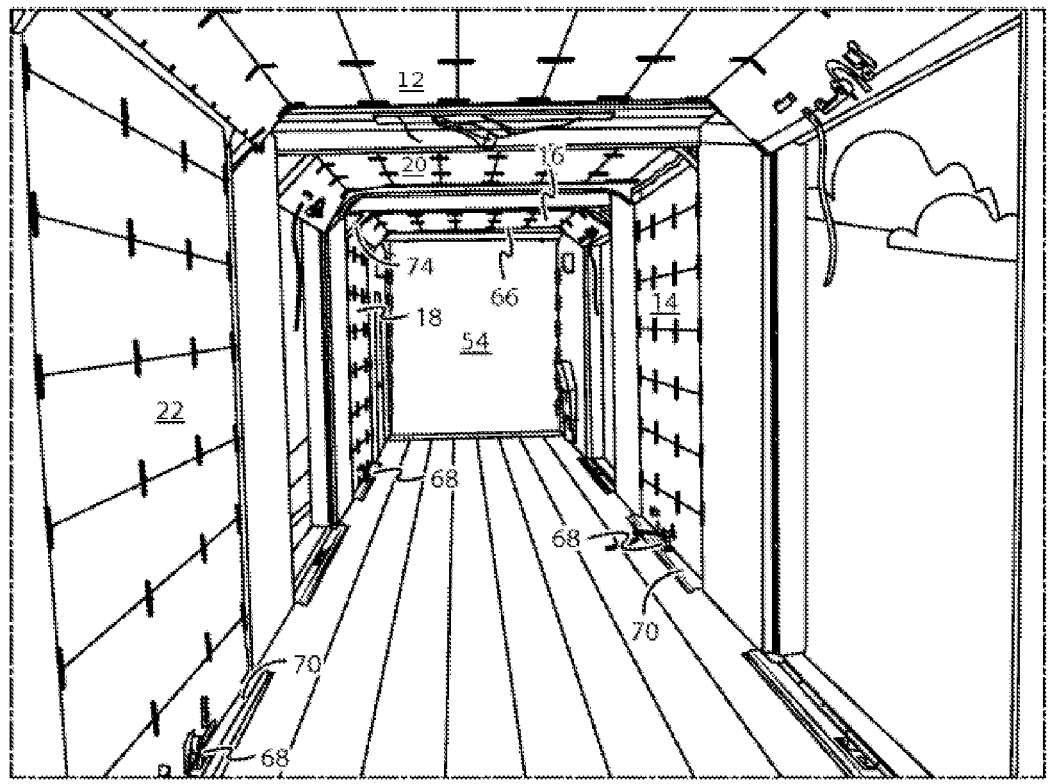
FIG. 3 is an interior view of a dock enclosure of a mobile dock.

FIG. 3 depicts the interior of the embodiment of mobile dock trailer 10 shown in the previous figures. First door 12, third door 16, and fifth door 20 are shown in the open positions. Second door 14, fourth door 18, and sixth door 22 are shown in the closed positions. The operation of the various doors and interaction between them is described in greater detail below. Each of the various doors of mobile dock enclosure 10 includes a latch 68 that engages a panel 70, to secure the respective door in a closed position. The various doors shown are preferably roll-up doors, each flanked by a first track 64 and second track 66. When moving between an open and closed position, each door travels along the tracks upon which it is mounted. These tracks offer a full range of motion, as shown by the relative positions of second door 14 and third door 16 in FIG. 3.

Figure 4:
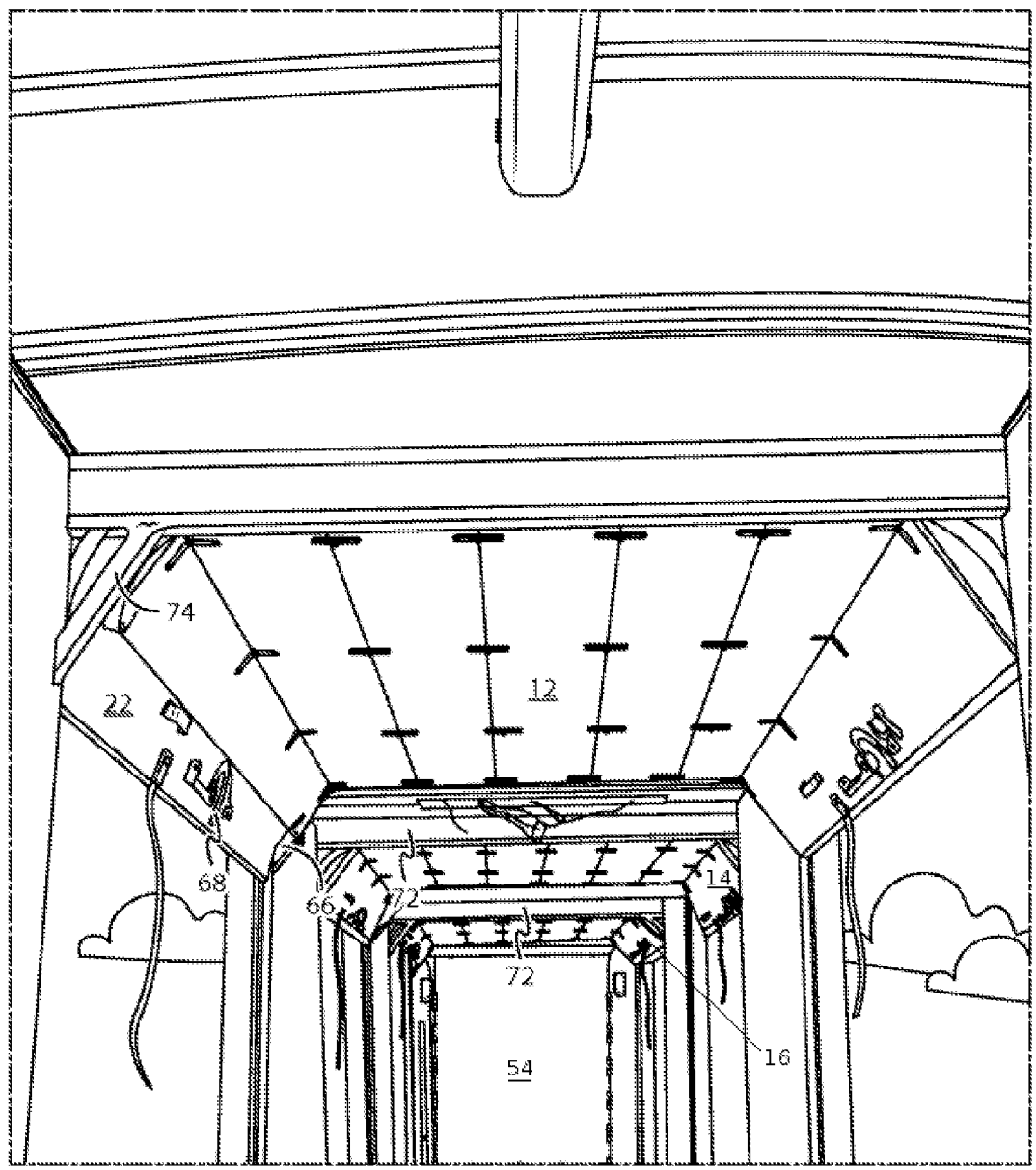
FIG. 4 is a close view of the ceiling of the interior of a dock enclosure of a mobile dock.

FIG. 4 is a close view of the interior of dock enclosure 52 of the embodiment of mobile dock 10 described above. More particularly, the figure shows a close view of the ceiling of dock enclosure 52, as well as the doors and associated structures therein. The foremost doors shown in the figure are first door 12 and sixth door 22, and the operation of those doors and their relationship to one another are now described. It is understood that the principles described here with respect to first door 12 and sixth door 22 apply equally to the other opposing sets of doors associated with dock enclosure 52, namely second door 14 and fifth door 20, and third door 16 and fourth door 18.

First door 12 and sixth door 22 are shown in FIG. 4 in the rolled up position. Each door has associated therewith a set of tracks, 64 and 66, as shown more closely in FIG. 5, below. The set of tracks 64 and 66 associated with first door 12 and sixth door 22 are offset in relation to one another, with one set of tracks 64 and 66 engaging sixth door 22 disposed just above the other set of tracks 64 and 66 engaging first door 12, when those tracks are disposed along the ceiling of dock enclosure 52. The result of this offset is that both first door 12 and sixth door 22 may be rolled up at the same time, both being retained along their respective tracks that run along the ceiling of dock enclosure 52, without either of first door 12 and sixth door 22 interfering with the movement of the other along its respective set of tracks. The ability to raise first door 12 and sixth door 22 allows the opposing openings in dock enclosure 52 to be used simultaneously, thereby allowing for more efficient use of the device than if only one door or the other could be opened at a given time, and also allowing the cross-section of dock enclosure 52 to be narrower than would be possible if first door 12 and sixth door 22 shared a common set of tracks and were to be opened at the same time. FIG. 4 also depicts cross-beams 72 and supports 74, which are preferably constructed of steel or other suitable material, and which provide structural support to dock enclosure 52.

Figure 5:
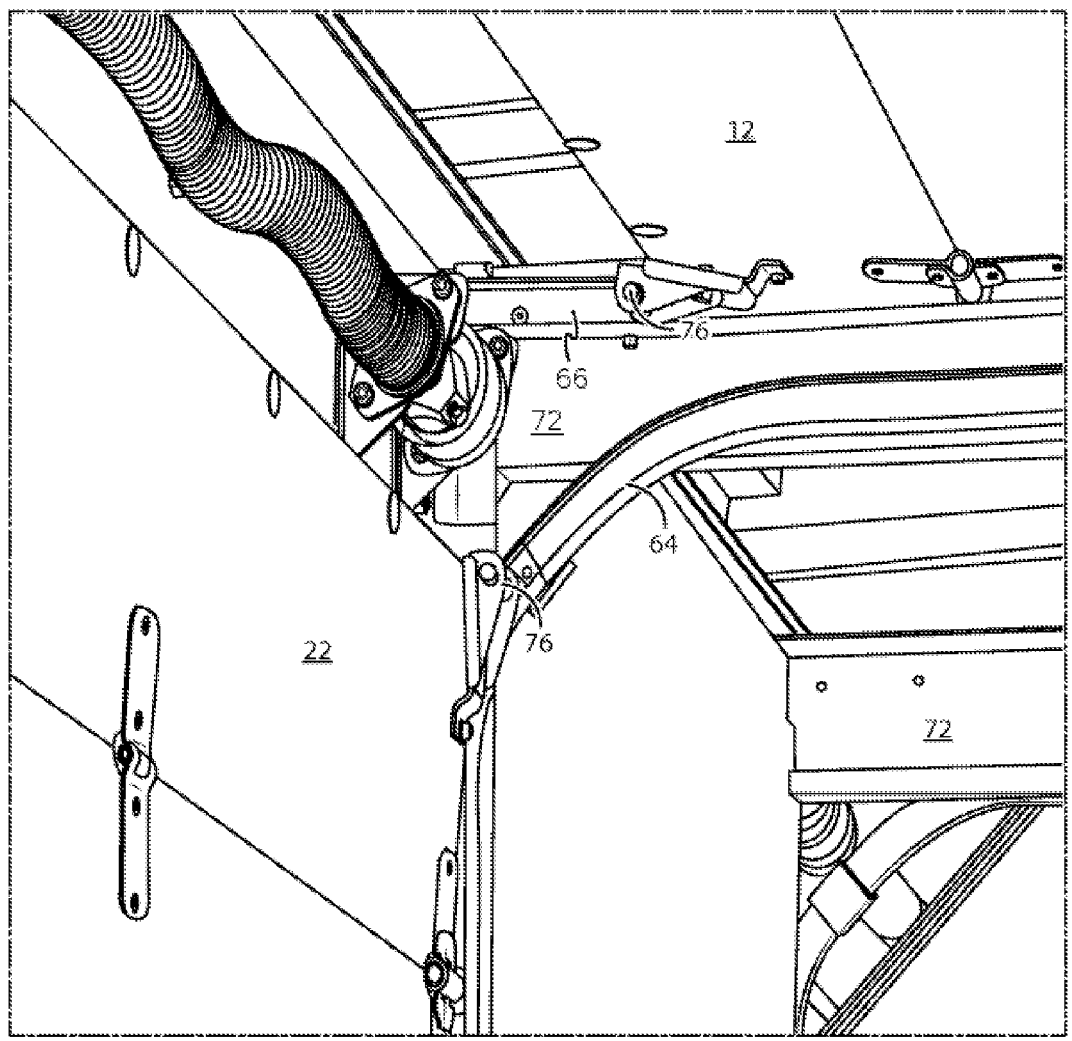
FIG. 5 is a close view of a portion of the ceiling of a dock enclosure of a mobile dock showing the door tracks and door roller assemblies associated therewith.

FIG. 5 provides a close view of roller assemblies 76 associated with each of the roll-up doors of mobile dock 10. As can be seen in the figure, roller assemblies 76 engage tracks 64 and are able to move along the length of the tracks, thereby allowing the associated door (such as fifth door 22 shown in the figure) to be raised and lowered. It is contemplated that roll-up doors and the associated roller assemblies are well known in the art, and a detailed description of the operation of these components of mobile dock 10 is not needed here. It should be noted, however, that any suitable mechanism to allow for raising and lowering of the doors of mobile dock 10 may be utilized. Further, though roll-up doors are shown in the embodiment of mobile dock 10 shown in the figures, it is contemplated that any suitable type of door, with any suitable mechanism for opening and closing the same, may be utilized. It is only required that the type of doors, or structure of mobile dock 10, or structures associated with the doors to allow opening and closing thereof, be such that opposing doors may be in the open position at the same time.

Figure 6:
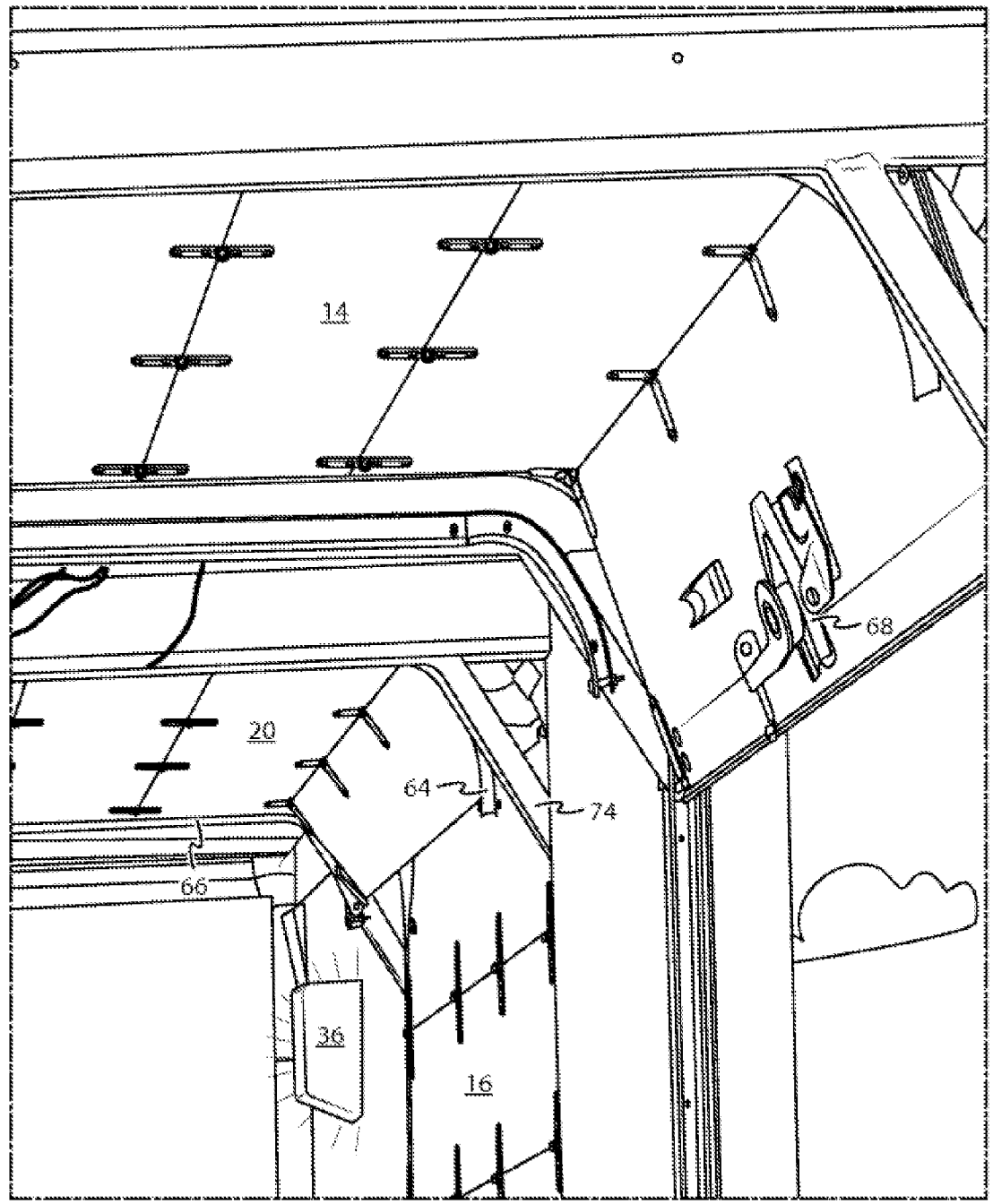
FIG. 6 is another close view of a portion of the ceiling of a dock enclosure of a mobile dock.

FIG. 6 provides another close view of the door and track mechanisms of the embodiment of mobile dock 10 described above, along with other features thereof. In FIG. 6, second door 14 is shown in an open position, while third door 16 is shown in a closed position. Latch 68 of second door 14 is visible, as are tracks 64 and 66 associated with each of the doors. Also shown is an interior light 36 of dock enclosure 52, used to provide illumination to the interior of dock enclosure 52.

Figure 7:
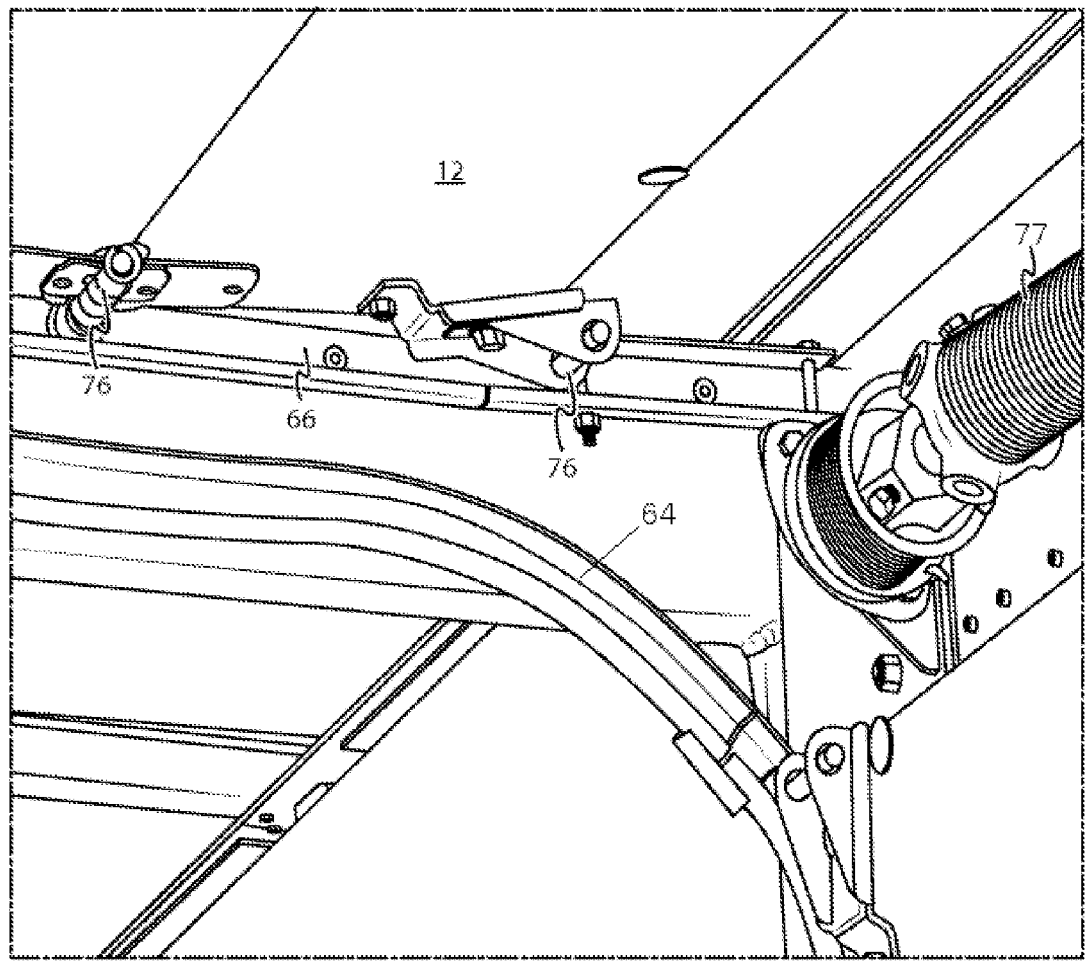
FIG. 7 is another close view of a portion of the ceiling of a dock enclosure of a mobile dock.

FIG. 7 provides an additional close view of tracks 64 and 66 and roller assemblies 76 associated with first door 12. Also shown in FIG. 7 is a conduit 77, through which wiring, for example, may be run as necessary to provide power to interior lights 36, exterior lights 38, and other structures that may be associated with mobile dock 10.

Figure 8:
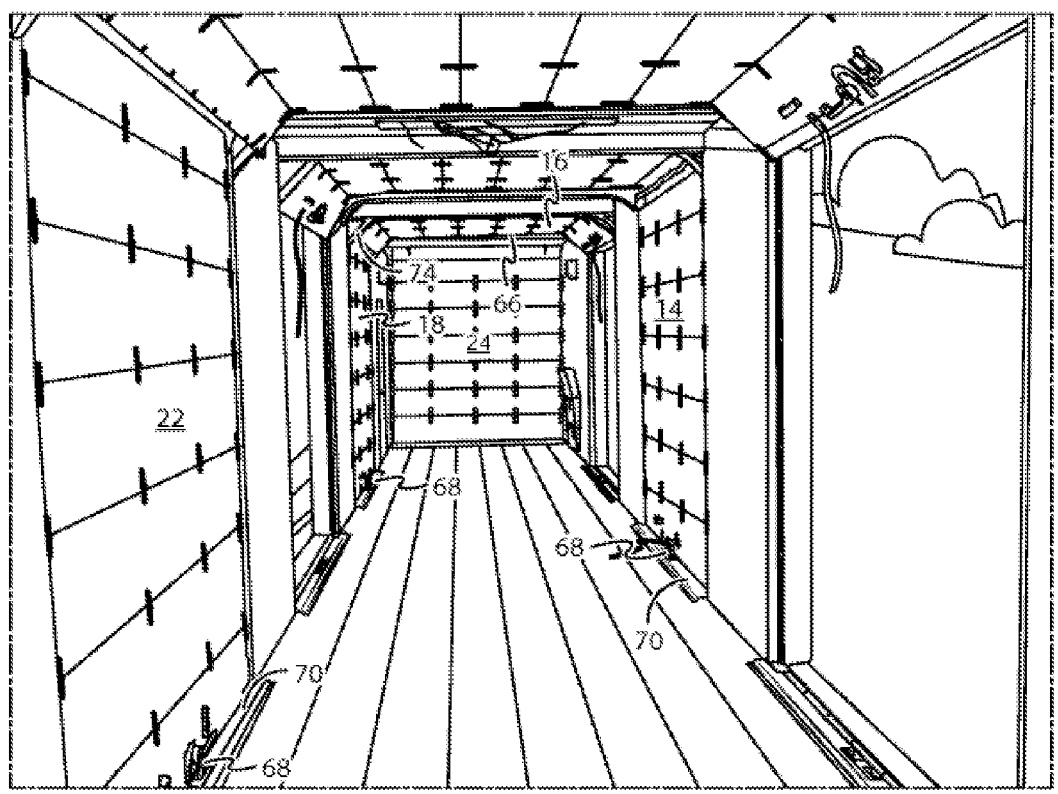
FIG. 8 is an interior view of an embodiment of a mobile dock enclosure having a seventh door associated therewith.

FIG. 8 provides a view of seventh door 24, which is positioned at one end of dock enclosure 52, opposite first end wall 54. Seventh door 24 operates on the same principles as described with respect to the other doors, above.

It is further noted that mobile dock 10 preferably includes a first side door 40 (also referred to as a "personnel door") and first side stair 42 leading thereto. First side stair 42 is detachable from mobile dock 10, and is in the position shown in FIG. 1 only when mobile dock 10 is stationary. First side door 40 may open directly into the interior of dock enclosure 52, or may open into an enclosed department used for storage or any other suitable purpose. A second side door 44 is preferably located on the opposite side of dock enclosure 52, and at the opposite end, from that shown in FIG. 1. A second side stair 46 may also be provided for access to second side door 44, and as with first side stair 42 it is contemplated that second side stair 46 is detachable from mobile dock 10 and used only when mobile dock 10 is in a stationary position.

Mobile dock 10 is operable to facilitate efficient loading and unloading of trucks at a warehouse, loading dock, or other such structure. Mobile dock 10 may be positioned such that seventh door 24 abuts the loading dock much as a traditional truck would when loading or unloading cargo. With mobile dock 10 in place, however, multiple trucks may be positioned along mobile dock 10, each with its trailer abutting one of the doors of mobile dock 10 as it would normally abut a loading dock or other structure. Thus, multiple trucks may be loaded or unloaded from a single entry point at a loading dock, with mobile dock 10 serving as an intermediate structure between the trucks to be loaded or unloaded and the loading dock. The various bumpers associated with mobile dock 10 protect mobile dock 10 from inadvertent damage by the trucks. Mobile dock 10 is positioned using a towing engine, which transports and positions mobile dock 10 in much the same way as a towing engine traditionally transports and positions a semi-trailer. When mobile dock 10 is in the desired position, landing gear/supports 50 are lowered to provide a stationary support for mobile dock 10 once the towing engine has been disengaged.

Wheels 48 may be provided with a braking mechanism to prevent inadvertent rolling of mobile dock 10 during use. Alternatively, mobile dock 10 may be provided with a dock hook or other structure designed to securely fasten mobile dock 10 to a loading dock or other structure where cargo is being loaded or unloaded. Some embodiments of mobile dock 10 may employ both a braking mechanism and a dock hook or related structure.

It is also contemplated that each of the roll-up doors of mobile dock 10 may be provided with an associated loading ramp positioned along the underside of mobile dock 10, which can be extended and hooked into place when necessary. The ramp may extend to the ground to facilitate loading and unloading from a ground surface rather than from a truck, or may extend to an adjacent truck when necessary or desirable to do so.

The mobile nature of mobile dock 10 allows easy transport from one location to another, and because mobile dock 10 is designed to be used in spaces where traditional semi-trailers are already used, there is no need for new infrastructure or construction in order to make use of mobile dock 10. Although shown in the drawings and described above as a semi-trailer, it is contemplated that mobile dock 10 may instead be a full trailer. Also, while the embodiment of mobile dock 10 described and shown includes seven doors, it is contemplated that mobile dock 10 may include a greater or lesser number of doors.

Use of mobile dock 10 allows the users thereof to efficiently separate bulk loads into multiple trucks simultaneously, without requiring each separate truck to position itself at the loading dock one at a time, with other trucks remaining immobile during the time period that one truck is being loaded or unloaded, or with other trucks having to position themselves at another loading dock. This increased efficiency allows two people, for example, to complete loading and unloading process that would require seven or eight people working at multiple trucks docked at separate locations.

Mobile dock 10 may be climate controlled, thus providing for improved working conditions, or providing the climate necessary for the type of cargo moving through mobile dock 10.

Mobile dock 10 may also be used to transport goods to a location where trucks will dock directly with mobile dock 10, absent any loading dock or other structure, so that the cargo contained within mobile dock 10 may be separated into those multiple trucks for delivery to other locations. The improved efficiency and logistics of such a use provides considerable advantage over requiring each of those separate trucks to travel to a distant distribution center. The same arrangement may be used when receiving goods from multiple trucks to be transported to a central distribution center.

Having thus described the preferred embodiment of the mobile dock, what is claimed as new and desired to be protected by Letters Patent includes the following:

1. A mobile dock trailer comprising:
   a dock enclosure having first and second opposing side walls and first and second opposing end walls;
   a first loading door in the first side wall;
   a second loading door in the second side wall;
   a third loading door in the second end wall;
   first and second wheels attached to an underside of the dock enclosure;
   a stationary support attached to the underside of the dock enclosure at a location distal to the first and second wheel;
   a first pair of tracks attached to a ceiling of the dock enclosure and the first side wall in a position flanking the first loading door, the first loading door comprising a roll-up door engaging said first pair of tracks; and
   a second pair of tracks attached to the ceiling of the dock enclosure and the second side wall in a position flanking the second loading door, the second loading door comprising a roll-up door engaging said second pair of tracks,
   wherein the first pair of tracks and the second pair of tracks are spaced apart relative to one another so that the first roll-up door and the second roll-up door overlap when rolled up, such that both roll-up doors can be rolled up simultaneously.

2. The mobile dock according to claim 1, further comprising:
   a third pair of tracks attached to the ceiling of the dock enclosure and the second end wall in a position flanking the third loading door, the third loading door comprising a roll-up door engaging said third pair of tracks.

3. The mobile dock according to claim 1, further comprising:
   a first side bumper attached to an exterior surface of the first side wall and extending therefrom, the first side bumper adjacent a first side of the first side door;
   a second side bumper attached to an exterior surface of the first side wall and extending therefrom, the second side bumper adjacent a second side of the first side door;
   a first top bumper attached to an exterior surface of the first side wall and extending therefrom, the first top bumper adjacent a top of the first side door; and
   a first bottom bumper attached to an exterior surface of the first side wall and extending therefrom, the first bottom bumper adjacent a bottom of the first side door.

4. A mobile dock trailer comprising:
   a dock enclosure having first and second opposing side walls, and first and second opposing end walls;
   a first loading door in the first side wall;
   a second loading door in the second side wall;
   a third loading door in the second end wall;
   first and second wheels attached to an underside of the dock enclosure;

a first pair of tracks attached to a ceiling of the dock enclosure and the first side wall in a position flanking the first loading door, the first loading door comprising a roll-up door engaging said first pair of tracks; and a second pair of tracks attached to the ceiling of the dock enclosure and the second side wall in a position flanking the second loading door, the second loading door comprising a roll-up door engaging said second pair of tracks, wherein the first pair of tracks and the second pair of tracks are spaced apart relative to one another so that the first roll-up door and the second roll-up door overlap when rolled up, such that both roll-up doors can be rolled up simultaneously.

5. The mobile dock according to claim 4, further comprising a wheel lock for securing said first and second wheels in a locked position.

6. The mobile dock according to claim 4, further comprising a stationary support attached to the underside of the dock enclosure at a location distal to the first and second wheels.

7. The mobile dock according to claim 4, further comprising a personnel door in the first side wall of the dock enclosure adjacent the first end wall thereof.

8. The mobile dock according to claim 4, further comprising a ramp movable between a first, extended position and a second, retracted position, said ramp extending from one of said loading doors when in the extended position and stored beneath the underside of said dock enclosure when in the retracted position.

9. The mobile dock according to claim 4, further comprising at least one bumper extending along the perimeter of each of said first, second, and third loading doors.

\* \* \* \* \*